US012380439B2

(12) United States Patent
Kaplan et al.

(10) Patent No.: US 12,380,439 B2
(45) Date of Patent: *Aug. 5, 2025

(54) AUTHENTICATED CROSS-SUBNET COMMUNICATION

(71) Applicant: Ava Labs, Inc., New York, NY (US)

(72) Inventors: Michael Edmond Kaplan, New York, NY (US); Stephen Buttolph, Brooklyn, NY (US); Daniel Laine, Jersey City, NY (US); Alexander Dunn, New York, NY (US); Cameron John Schultz, Chicago, IL (US); Aaron Buchwald, New York, NY (US); Patrick Robert O'Grady, Palo Alto, CA (US); Bernard Wong, Waterloo (CA)

(73) Assignee: Ava Labs, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/909,109

(22) Filed: Oct. 8, 2024

(65) Prior Publication Data

US 2025/0037120 A1 Jan. 30, 2025

Related U.S. Application Data

(63) Continuation-in-part of application No. 18/615,932, filed on Mar. 25, 2024, now Pat. No. 12,120,246.
(Continued)

(51) Int. Cl.
*H04L 9/40* (2022.01)
*G06Q 20/38* (2012.01)
(Continued)

(52) U.S. Cl.
CPC ..... *G06Q 20/3825* (2013.01); *G06Q 20/3829* (2013.01); *G06Q 20/401* (2013.01); *H04L 9/3247* (2013.01)

(58) Field of Classification Search
CPC .......... G06Q 20/3825; G06Q 20/3829; G06Q 20/401; H04L 9/3247
See application file for complete search history.

(56) References Cited

U.S. PATENT DOCUMENTS 9,473,945 B1 * 10/2016 Marquardt ............ H04W 12/10
10,484,343 B1    11/2019 Silberman et al.
(Continued)

FOREIGN PATENT DOCUMENTS

WO    2022/109851 A1    6/2022

OTHER PUBLICATIONS

[No Author Listed] Coinbase. What is the Inter-Blockchain Communication Protocol (IBC)? Jan. 26, 2022, 11 pages. Retrieved from <https://www.coinbase.com/developer-platform/discover/dev-foundations/ibc-protocol> on Jun. 24, 2024.
(Continued)

*Primary Examiner* — Ghodrat Jamshidi
(74) *Attorney, Agent, or Firm* — McDermott Will & Emery LLP

(57) ABSTRACT

Various aspects of the subject technology relate to systems, methods, and machine-readable media for cross-chain communication in a blockchain platform. Various aspects may include accepting, at a first blockchain, a first transaction including a message and a message payload. Aspects may also include validating, at the first blockchain, the message by signing the message using signature keys of one or more validators in a first set of validators of the first blockchain. Aspects may also include generating an aggregate signature based on the signature keys of the one or more validators in a first set of validators. Aspects may also include submitting a second transaction on to a second blockchain, the second transaction including the message and the aggregate signa-
(Continued)

ture. Aspects may include validating, at the second blockchain, the second transaction based on a shared registry.

21 Claims, 6 Drawing Sheets

Related U.S. Application Data

(60) Provisional application No. 63/455,919, filed on Mar. 30, 2023.

(51) Int. Cl.
*G06Q 20/40* (2012.01)
*H04L 9/32* (2006.01)

(56) References Cited

U.S. PATENT DOCUMENTS

| | | | |
|---|---|---|---|
| 11,317,128 B1* | 4/2022 | Perkalsky | H04N 21/23605 |
| 2017/0155515 A1 | 6/2017 | Androulaki et al. | |
| 2018/0145836 A1 | 5/2018 | Saur et al. | |
| 2018/0308134 A1* | 10/2018 | Manning | G06Q 30/0277 |
| 2019/0354518 A1 | 11/2019 | Zochowski | |
| 2020/0081699 A1* | 3/2020 | Majed | H04L 9/0637 |
| 2020/0082126 A1* | 3/2020 | Brown | G06Q 20/401 |
| 2020/0104294 A1* | 4/2020 | Alas | G06F 16/2365 |
| 2020/0394648 A1* | 12/2020 | Blackshear | H04L 63/12 |
| 2020/0396081 A1* | 12/2020 | Ansel | G06F 11/0751 |
| 2021/0036858 A1* | 2/2021 | Bruso | H04L 9/3231 |
| 2021/0049600 A1* | 2/2021 | Spector | H04L 9/085 |
| 2021/0067345 A1 | 3/2021 | Shamai et al. | |
| 2021/0097537 A1 | 4/2021 | Guo et al. | |
| 2021/0097538 A1 | 4/2021 | Guo et al. | |
| 2021/0099312 A1 | 4/2021 | Guo et al. | |
| 2021/0119807 A1 | 4/2021 | Chen et al. | |
| 2021/0150065 A1 | 5/2021 | Qiu | |
| 2021/0304191 A1 | 9/2021 | O'Grady | |
| 2021/0367793 A1 | 11/2021 | Shamai et al. | |
| 2022/0094555 A1* | 3/2022 | Roy | G06Q 20/065 |
| 2022/0156725 A1* | 5/2022 | Iwama | G06Q 20/3676 |
| 2022/0374886 A1 | 11/2022 | Micali et al. | |
| 2022/0391474 A1* | 12/2022 | Assadipour | G06F 21/16 |
| 2024/0187263 A1* | 6/2024 | Malepati | H04L 9/50 |
| 2024/0241714 A1* | 7/2024 | Mahajan | G06F 8/36 |

OTHER PUBLICATIONS

International Search Report and Written Opinion for International Patent App. No. PCT/US2024/021375, mailed Jul. 12, 2024 (16 pages).

\* cited by examiner

AUTHENTICATED CROSS-SUBNET COMMUNICATION

CROSS-REFERENCE TO RELATED APPLICATIONS

The present disclosure is related and claims priority under 35 U.S.C. § 120 as a continuation-in-part of U.S. patent application Ser. No. 18/615,932, entitled AUTHENTICATED CROSS-CHAIN COMMUNICATION, to Michael Edmond Kaplan et al., filed on Mar. 25, 2024, which claims the benefit of US Provisional Application No. 63/455,919, filed on Mar. 30, 2023, the contents of which are hereby incorporated by reference in their entirety, for all purposes.

TECHNICAL FIELD

The present disclosure generally relates to cross-chain or cross-subnet communication in a blockchain network. More specifically, the present disclosure relates to enabling efficient cross-subnet messaging in such a way that does not require trust in any additional parties other than the subnet validators.

BACKGROUND

Conventional blockchain technology includes a growing list of records, called blocks, which are linked together. A blockchain network includes nodes such as a validator node that participates in consensus. Validator nodes are capable of verifying, voting on, staking and/or maintaining a record of transactions for the blockchain network as well as storing a copy of the blockchain. Validators are also responsible for producing and/or proposing blocks for addition to the blockchain network. Validators can participate in a consensus voting protocol for implementation of blockchain deployments or building on subnets. A subnet is a dynamic set of validators working together to achieve consensus on the state of a set of blockchains. Each blockchain is validated by exactly one subnet. However, a subnet can validate many blockchains.

BRIEF SUMMARY

The subject disclosure provides for systems and methods for sending messages between blockchains, each validated by their own set of validators, using a messaging protocol. According to embodiments, a computer-implemented method for cross-chain communication in a blockchain platform is provided. The method includes accepting, at a first blockchain, a first transaction including a message and a message payload. The method also includes validating, at the first blockchain, the message by signing the message using signature keys of one or more validators in a first set of validators of the first blockchain. The method also includes generating an aggregate signature based on the signature keys of the one or more validators in a first set of validators. The method also includes submitting a second transaction on to a second blockchain, wherein the second transaction includes the message and the aggregate signature. The method also includes validating, at the second blockchain, the second transaction based on a shared registry.

According to embodiments, a system is provided including a processor and a memory comprising instructions stored thereon, which when executed by the processor, cause the processor to perform a method for cross-chain communication in a blockchain platform. The method includes accepting, at a first blockchain, a first transaction including a message and a message payload, wherein the payload indicates the destination blockchain at the second blockchain and a destination address within the second blockchain. The method also includes validating, at the first blockchain, the message by signing the message using signature keys of one or more validators in a first set of validators of the first blockchain. The method also includes generating an aggregate signature based on the signature keys of the one or more validators in a first set of validators. The method also includes submitting a second transaction on to a second blockchain, wherein the second transaction includes the message and the aggregate signature. The method also includes validating, at the second blockchain, the second transaction based on a shared registry.

According to embodiments, a non-transitory computer-readable storage medium is provided including instructions (e.g., stored sequences of instructions) that, when executed by a processor, cause the processor to perform a method for communicating between blockchains in a blockchain platform. The method includes accepting, at a first blockchain, a first transaction including a message and a message payload. The method also includes validating, at the first blockchain, the message by signing the message using signature keys of one or more validators in a first set of validators of the first blockchain. The method also includes generating an aggregate signature based on the signature keys of the one or more validators in a first set of validators. The method also includes submitting a second transaction on to a second blockchain, wherein the second transaction includes the message and the aggregate signature based on the message payload. The method also includes accepting, at the second blockchain, the second transaction. The method also includes validating the second transaction based on the aggregate signature and a shared registry.

These and other embodiments will become clear to one of ordinary skill in the art, in view of the following.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

Figure 1:
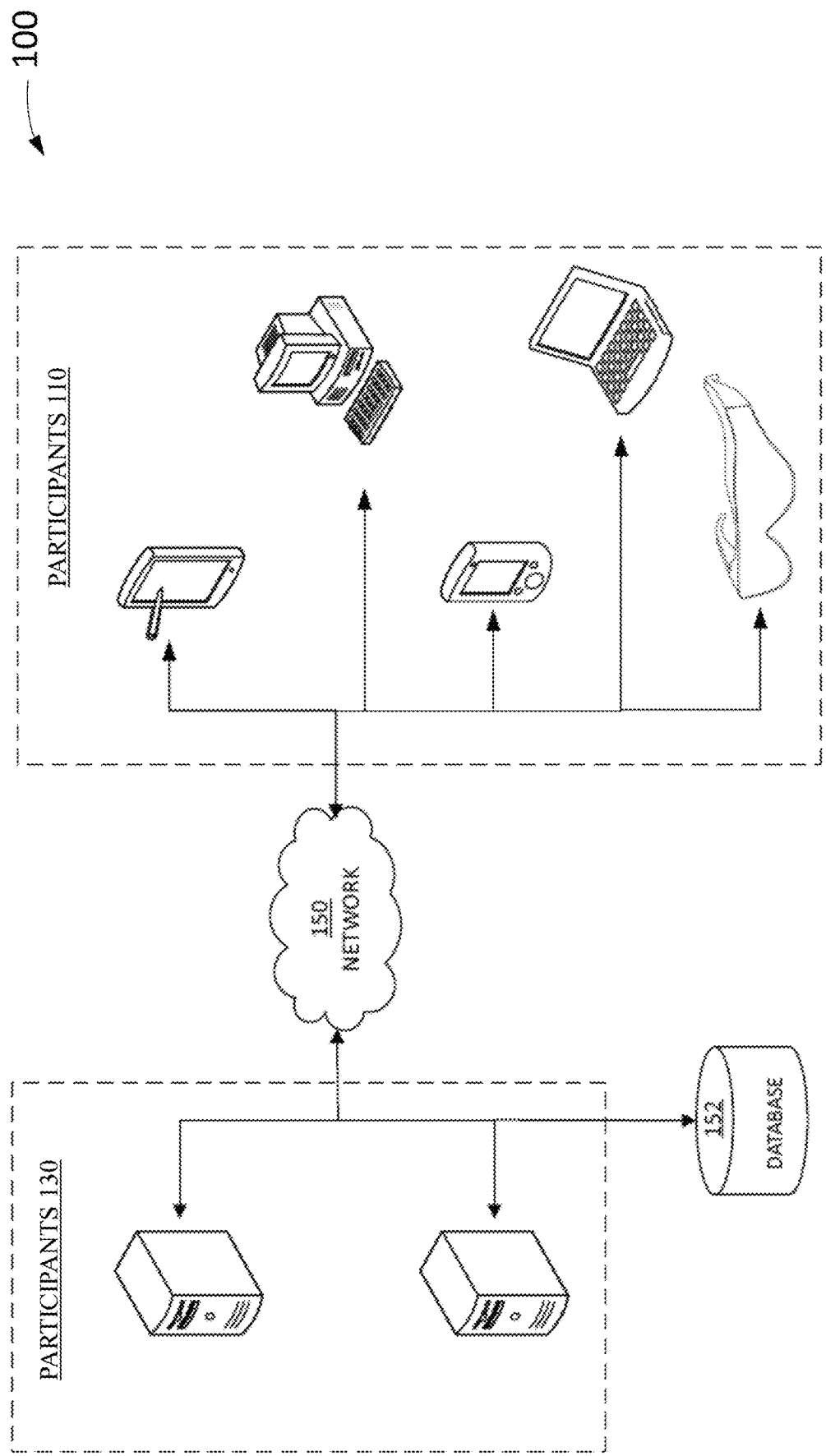
FIG. 1 is a block diagram of a device operating environment with which aspects of the present disclosure can be implemented.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

The detailed description set forth below describes various configurations of the subject technology and is not intended to represent the only configurations in which the subject technology may be practiced. The detailed description includes specific details for the purpose of providing a thorough understanding of the subject technology. Accordingly, dimensions may be provided in regard to certain aspects as non-limiting examples. However, it will be apparent to those skilled in the art that the subject technology may be practiced without these specific details. In some instances, well-known structures and components are shown in block diagram form in order to avoid obscuring the concepts of the subject technology.

General Overview

Blockchain platforms, such as for smart contracts, may require a consensus protocol as a fundamental building block for building distributed systems. As an example, a blockchain platform can include multiple blockchains, such as a component exchange blockchain for creating and trading digital smart assets, a metadata blockchain for coordinating validators as well as tracking and creating subnets, and a contract blockchain for creating smart contracts. As used herein, a subnet or subnetwork includes a dynamic set of nodes (e.g., one or more validators) seeking to achieve consensus on a state of a set of blockchains such that one blockchain is validated by one subnet although one subnet can validate multiple blockchains. A node can participate in the validation of multiple subnets and can be subject to requirements of the blockchains within those subnets, such as for security, licensing, hardware and/or the like.

Blockchains being validated by validators may be of a blockchain network (or platform) with application-level logic defined by multiple virtual machines (VMs) which enable more decentralized networks. In particular, a blockchain may be an instance of a VM that specifies the blockchain's state, state transition function, transactions, and application programming interface (API) for user interaction. The VM allows for the execution of smart contracts and decentralized applications on the blockchain, providing a secure and deterministic environment for code execution and enabling interoperability between blockchains or cross-chain communication. Although subnets can validate different blockchains, different blockchains are unable to communicate with each other across subnets without intermediaries. As such, there is a need for enabling cross-subnet communication where one subnet can communicate, for example, the state of a blockchain in the subnet to another subnet in a secure way without intermediaries.

Embodiments, as disclosed herein, provide a solution to the above-mentioned problems rooted in computer technology, namely, cross-subnet communication in a blockchain network according to a messaging protocol. The disclosed subject technology improves the functioning of the computer itself by enabling the exchange of messages (of any type) and data between different subnets based on the subnet's validators. This increases security while reducing validation costs and transaction speeds. According to embodiments, messages including, but non-limiting to, a state, transaction, or event that has occurred on a blockchain of a first subnet can be sent to a second subnet. The second subnet is able to validate the messages originating from the first subnet without needing trusted intermediaries responsible for verifying the messages that are being transferred between different blockchains (e.g., bridge validators).

The disclosed subject technology further provides improvements to the technological field by facilitating communication between subnets on a blockchain network (e.g., in a primary network of the blockchain network) and various chains, allowing for the transfer of data and value across different chains, creating a dynamic, enhanced, and interconnected ecosystem. The blockchain network can facilitate communication between any subnet corresponding to any of the validator sets registered to the blockchain network's registry. That is, information (e.g., messages, blocks, assets, arbitrary function calls, etc.) can be sent even between blockchains and/or subnets that do not have a same validator set.

Aspects of embodiments are not limited to implementation in subnets and may be implemented in or between, for example, any two blockchains or VMs. The message protocol may use a standardized message format for any message (e.g., message 302) across all VMs. Part of the message format may include an arbitrary payload. In some implementations, VMs can choose to implement the message protocol and define their own payload formatting and message handling.

In order for two subnets to effectively interoperate using the message protocol, they must know of each other's expected payload formats. As such, payload formats may be registered on, for example, the primary network or, similarly, a chain of the primary network (e.g., platform chain (P-chain) of a blockchain network). The blockchain network may include a shared registry of all subnets' validator sets. Each validator is associated with a Boneh-Lynn-Shacham (BLS) key. The primary network (of the blockchain network) may coordinate validators and create subnets. The primary network may maintain the registry of validators and their associated BLS key. That is, all subnet validators are registered on the primary network and are known to all nodes in the greater blockchain network. Thus, the subnet validators can verify that a message was signed by a threshold of another subnet's stake without needing to know anything else about the state of the other subnet.

Using the BLS key, any subnet may validate and send a message originating from another subnet within the blockchain network. The validation occurs by leveraging a cryptographic signature scheme (which allows a user to verify that a signer is authentic) and an agreement between validators of both subnets participating in the transfer/communication based on the shared registry. The agreement between subnets dictates that validators between subnets in communication agree on who validates each chain. Subnets within the blockchain network can interoperate using aggregate signatures of participating subnets of the communication as the signature scheme to verify messages between the subnets.

According to embodiments, signatures of message signing validators are aggregated into a single signature that is delivered to a destination subnet as the data of a transaction. In some embodiments, a relayer (a type of node that opts-in to perform signature aggregation) aggregates the signatures and then broadcasts to the destination subnet (i.e., how a message gets delivered from the first subnet to the second subnet). In some embodiments, any relayer may serve any subnet. In some embodiments, subnets specify which relayers they will allow to deliver a specific message. Specifying a closed set of relayers allows relayers in the closed set to perform additional verification checks before delivering a message and drop messages that do not meet certain criteria. As such, the closed set of relayers may serve as an additional layer of security to ensure that harmful messages (e.g., messages that have harmful effects such as cyber-attacks on funds) are stopped before experiencing any of the consequences.

When the destination subnet receives the message, the destination subnet looks up the public keys of the validators of the source subnet from the shared registry and uses them to validate the signature before executing (or broadcasting) a message. As such, the messaging protocol acts as an authenticated cross-network messaging protocol that leverages a distributed validator certificate registry on the primary network. This increases security, reduces the size and verification costs of validating messages, and a scalable open solution to cross-subnet communication by eliminating the need for, e.g., bridge validators to support specific chains in order to be used. In some embodiments, the messaging protocol may function as a platform, providing a buildable structure where users can incorporate services on top of the platform. By non-limiting example, users of subnets in a blockchain network can develop cross-chain applications (e.g., bridges, cross-chain swaps, smart contract support, governance/cross-chain governance, etc.) via the platform.

As used herein, the term "blockchain" generally refers to an open and distributed public ledger comprising a growing list of records, which are linked using cryptography. By design, the blockchain is resistant to modification of the data. The blockchain can include an auditable database that provides a distributed, replicated ledger of cryptographically certified artifacts whose contents are extremely difficult to tamper with without detection, and therefore, are with very high probability, true copies of the intended content, and whose content are open for inspection via a suitable query interface.

As used herein, the term "block" generally refers to a record that is kept in a blockchain. For example, each block contains a cryptographic hash of the previous block, a timestamp, and transaction data, which can generally be represented as a Merkle tree root hash.

As used herein, the term "subnet" or "subnetwork" generally refers to a dynamic set of validators working together to achieve consensus on a state of a set of blockchains. For example, each blockchain is validated by exactly one subnet. A subnet can validate arbitrarily many blockchains. A validator node may be a member of arbitrarily many subnets. A subnet may manage its own membership and it may require that its constituent validators have certain properties.

As used herein, the term "primary network" generally refers to a special subnet, which validates built-in blockchains. Members of the subnets may also be a member of the primary network. In some embodiments, a subject that is a member of the primary network, stakes (e.g., acquires or "buys") one or more tokens from the primary network. As a result, blockchain validators can validate built-in blockchains on the primary network and have also staked primary network tokens.

According to aspects, subnets enable the creation of a heterogeneous network of blockchains that can communicate with each other. In embodiments as disclosed herein, numerous validators supporting different blockchains are able to interact with one another. Accordingly, a system as disclosed herein coordinates subnet interactions by learning the source of truth for the blockchain state (the validator set) and interactions of the blockchain state. In addition, the system incentivizes the subnets to economically sustain the validators.

Although both forks and subnets support a variety of underlying virtual machines (VMs) and their participants, a subnet enables interoperability of different types of virtual machines from the main network (e.g., primary network). On the other hand, forks split the network into isolated historical versions of the main network and make it impossible to maintain the code base and communicate with it. Accordingly, in some embodiments, forking is temporal, whereas subnets are spatial.

Embodiments as disclosed herein include subnets to facilitate the operation and management of customized blockchains by cutting down development time from years to only weeks. The subnets also provide performance isolation, such that performance impacts to one of the subnets may not impact other subnets, as long as they are not communicating with one another. Subnets also allow the creator, miner, or administrator (e.g., user) to limit, manage and assign validators.

In some embodiments, a customized blockchain may include a VM marketplace having subnets serviced by unique VM modules that allow users to create feature sets directed to specific needs. For example, a gaming application in the VM marketplace will have different VM modules than a finance application.

Example Architecture

FIG. 1 is a block diagram of a device operating environment with which aspects of the present disclosure can be implemented. FIG. 1 illustrates an exemplary network architecture 100 to provide a blockchain platform (e.g., blockchain network implementation/deployment platform) for managing blocks and the transfer of messages, according to some embodiments. Blockchains in the blockchain network are validated by (i.e., the state of it is maintained by) a group of nodes. The group of nodes is called a subnet. As such, the blockchain platform includes subnets with corresponding validator sets. The network architecture 100 includes a shared registry of validators made up of all the subnets' validator sets. The blockchain may be a linear chain of blocks of the same dimension, such as the same height, size, length, etc. Blocks of the blockchain may comprise or store data or organized information (e.g., records of information), including a cryptographic hash of the previous block, a timestamp, and transaction data, for example. The network architecture 100 of FIG. 1 includes one or more participants 110 and one or more participants 130 which are communicatively coupled through the network 150. The blockchain architecture of the network architecture 100 can be a distributed database that maintains a continuously growing list of ordered records as the blocks. The blockchain architecture may implement a messaging protocol based on the shared registry of validators. The messaging protocol is designed to facilitate seamless communication between various chains, allowing for the transfer of data and value across different subnets, thereby enhancing the interoperability of the blockchain network.

It is understood that the participants 130 may include the participants 110 as well, such that they are peers. As an example, the participants 130 may include a cloud server or a group of cloud servers. In some implementations, the participants 130 may not be cloud-based servers (i.e., may be implemented outside of a cloud computing environment) or may be partially cloud-based. For example, the participants 110 may include any one of a laptop computer, a desktop computer, or a mobile device such as a smart phone, a palm device, or a tablet device. As an example, the participants 110 may be clients of the blockchain platform for creating, expanding, or otherwise modifying customized blockchain networks and/or private or public subnets. As an example, the participants 110 can function as validators. As an example, the participants 110 may be virtual machines (VMs) that form nodes of the blockchain network architecture 100. The participants 110 that function as nodes can run software to verify block and transaction data, store data, validate, respond to network requests for data, and/or the like for the existing blockchain. VMs can be computers that run on blockchain and allow smart contracts from multiple sources to interact with one another. The participants 110 send messages or issue transactions upon request by the participants 130, such as via a module of the participants 130 at a particular time. The messages may be validated by a validator of the blockchain network.

The network 150 may include a wired network (e.g., via fiber optic or copper wire, telephone lines, and the like) or wireless network (e.g., a cellular network, radio-frequency (RF) network, Wi-Fi, Bluetooth, and the like). The participants 110 may be any one of a mobile device, a laptop, a desktop, a tablet (e.g., palm or pad) device, a television, a display device, and/or the like. The participants 110 can be controlled by users as a set of validator nodes for making decisions in tandem, such as for facilitating operation or design of the blockchain implementations of the blockchain platform. Multiple participants 110 may have access to the blockchain platform hosted by the participants 130 via an online or offline connection, such as a wireless connection, wired connection, ad hoc connection, mobile connection, satellite connection, and/or the like. Each of the participants 130 may be a computing device such as part of a cloud computing server including one or more desktop computers or panels mounted on racks, and/or the like. The panels may include processing boards and also switchboards, routers, and other network devices.

Furthermore, features of the blockchain network architecture 100 may improve cross-subnet communication by reducing the processing load/cost associated with leveraging third party validators to verify messages. According to embodiments, cross subnet messaging may be improved by virtue of making transactions faster, more efficient, and more secure and providing reliable native communications between subnets and different blockchains within.

The participants 130 may store data of the existing blockchain in a peer-to-peer (P2P) and/or distributed ledger fashion in a database 152. The database 152 may store relevant information regarding, for example, the shared registry, execution, and verification logic and/or rules for implementing messaging protocols, etc. In particular, the participants 130 may function in conjunction to autonomously manage the decentralized database(s) of the existing blockchain via the P2P network and a distributed timestamping server of the participants 130. The participants 130 may be configured to implement multiple chains of the blockchain network architecture 100. For example, the participants 130 can implement a plurality of chains of the blockchain network architecture 100, such as an asset blockchain (e.g., for creating new assets, asset exchange, cross-subnet transfers), metadata blockchain (e.g., for coordinating validators, tracking active subnets, and creating new subnets), smart contract blockchain (e.g., for creating smart contracts and applications that require total ordering), etc. The plurality of chains or built-in layers of the blockchain can be validated by a primary network of the blockchain network architecture 100 that comprise all existing subnets. The primary network may also keep the shared registry for all validator sets of the subnets. Each validator is associated with a BLS key, which is also registered on the primary network.

Figure 2:
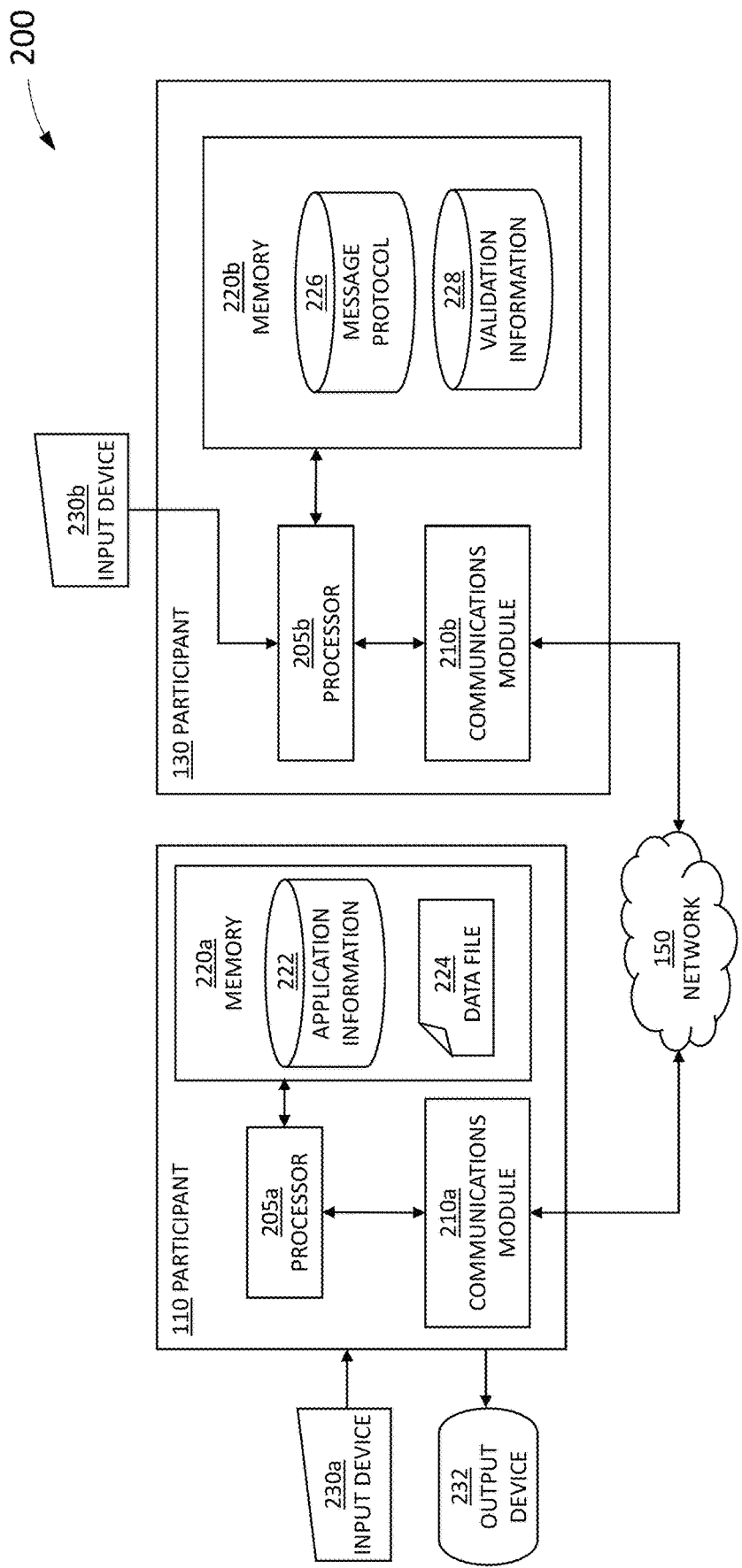
FIG. 2 is a block diagram illustrating details of devices used in the architecture of FIG. 1, according to some embodiments.

FIG. 2 is a block diagram of an example computing network 200 of an example blockchain platform for authenticated cross-subnet communication using a messaging protocol. The example computing network 200 may implement the messaging protocol for any subnet or chain in a platform, enabling both cross-chain and cross-subnet communication alike. FIG. 2 illustrates a participant (of one or more participants 110) and a server (of one or more participants 130) of the example computing network 200 for use in the network architecture of FIG. 1, according to some embodiments. The blockchain platform of the example computing network 200 may include blockchains represented by the one or more participants 110 and a plurality of platform blockchains validated and secured by a primary subnet (e.g., primary network) and may be represented by the one or more participants 130. The blockchains may be validated by a set of validators. A subnet may refer to a dynamic set of validators of the one or more participants 110 working together to achieve consensus on the state of a set of blockchains in the platform.

A subnet of the one or more participants 110/130 may be used to implement a message protocol according to one or more embodiments. For example, the message protocol can be used to transmit and validate messages from another subnet in the network. Each of the one or more participants 110 and the one or more participants 130 may access each other and other devices in the network 150 via corresponding communications modules 210a-210b. By non-limiting example, participant 110 may be trying to send a message to participant 130. Participant 130 may reference another participant (not shown), such as a primary platform chain to look up signature keys for validators of participant 110. The communications modules 210a-210b may each include radio hardware and software such as RF antennas, analog circuitry, digital to analog conversion circuits, digital signal processing circuitry, and/or the like. The specific participant 110 and participant 130 depicted in FIGS. 1-2 may each include a processor 205a-205b and memory 220a-220b, respectively. Memories 220a and 220b, and processors 205a and 205b, and communications modules 210a and 210b will be collectively referred to, hereinafter, as "memories 220" and "processors 205" and "communications modules 210." Processor 205a of the participant 110 may be used to operate the participant 110, such as to execute applications and functions thereof rendered on the participant 110. In some embodiments, the participants 110/130 may be operated as a blockchain validator, such as to verify transactions on the existing blockchain. The participant 110 can receive rewards (e.g., cryptocurrency) in exchange for verifying transactions or for participating and staking a network token of the blockchain platform. The participant 110 can be part of a set or list of validators including other validators of the one or more participants 110.

Generally, the participant 110 and the participant 130 include computing devices including at least: the memories 220 storing instructions and processors 205 configured to execute the instructions to perform, at least partially, one or more steps as described in methods according to one or more embodiments. For example, memory 220a of participant 110 may be used to perform functions associated with the blockchain platform hosted by the participant 130, such as functioning as a validator node or VM to maintain the integrity of the existing blockchain, a relayer, and/or other entity. The participant 110 can be one of a plurality of validators (or nodes) that may be organized into a small list of validators for randomly sampling proposers of the next block added to the existing blockchain. A list of the subnet's validators can be extracted by the participant 130 from a designated blockchain platform chain.

Settings of the participant 110 can be defined via user/operator input, such as via an input device 230b. The participant 110 can implement the message control described herein based on information stored in the application information 222. Data and files associated with the application information 222 may be stored in a data file 224 (or, e.g., database 152). The participant 110 may be used by a user of the blockchain platform, such as to perform message transfer, exchange transactions, blockchain validation, block proposal, and other blockchain functions, such as via a graphical user interface (GUI) or display for the user of participant 110. For example, the participant 110 may be coupled to at least one input device 230a and output device 232 accessible by the user (e.g., for user input and output perceivable by the user). The input device 230a can include a mouse, keyboard, a pointer, a stylus, a touchscreen display, microphone, voice recognition software, GUI, and/or the like. The output device 232 can include a display (e.g., the same touchscreen displays as the input device), a speaker, an alarm, and the like.

Memory 220b may include a message protocol 226 and validation 228. The message protocol 226 may include instructions for creating and broadcasting messages. The validation 228 may store instructions for verifying messages in accordance with the message protocol 226.

Although the above description describes certain functions being performed by the processor 205a of the participant 110 and other certain functions being performed by the processor 205b of the participant 130, all of the functions described herein can be performed by the participant 110 and/or the participant 130 in some other alternative division of labor. That is, the processors 205 could perform more or less of the functions described above. In some embodiments, some or part of the participant 110 can be co-located with the participant 130. That is, the participant 130 can be remote from or both the participant 110 and the participant 130 can be part of the same larger computing system, network, or architecture. It is also understood that participant 110 may include message protocol and validation information in its memory 220a, and participant 130 may include application information and data files in its memory 220b, such that they have parallel structures.

The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s).

Figure 3:
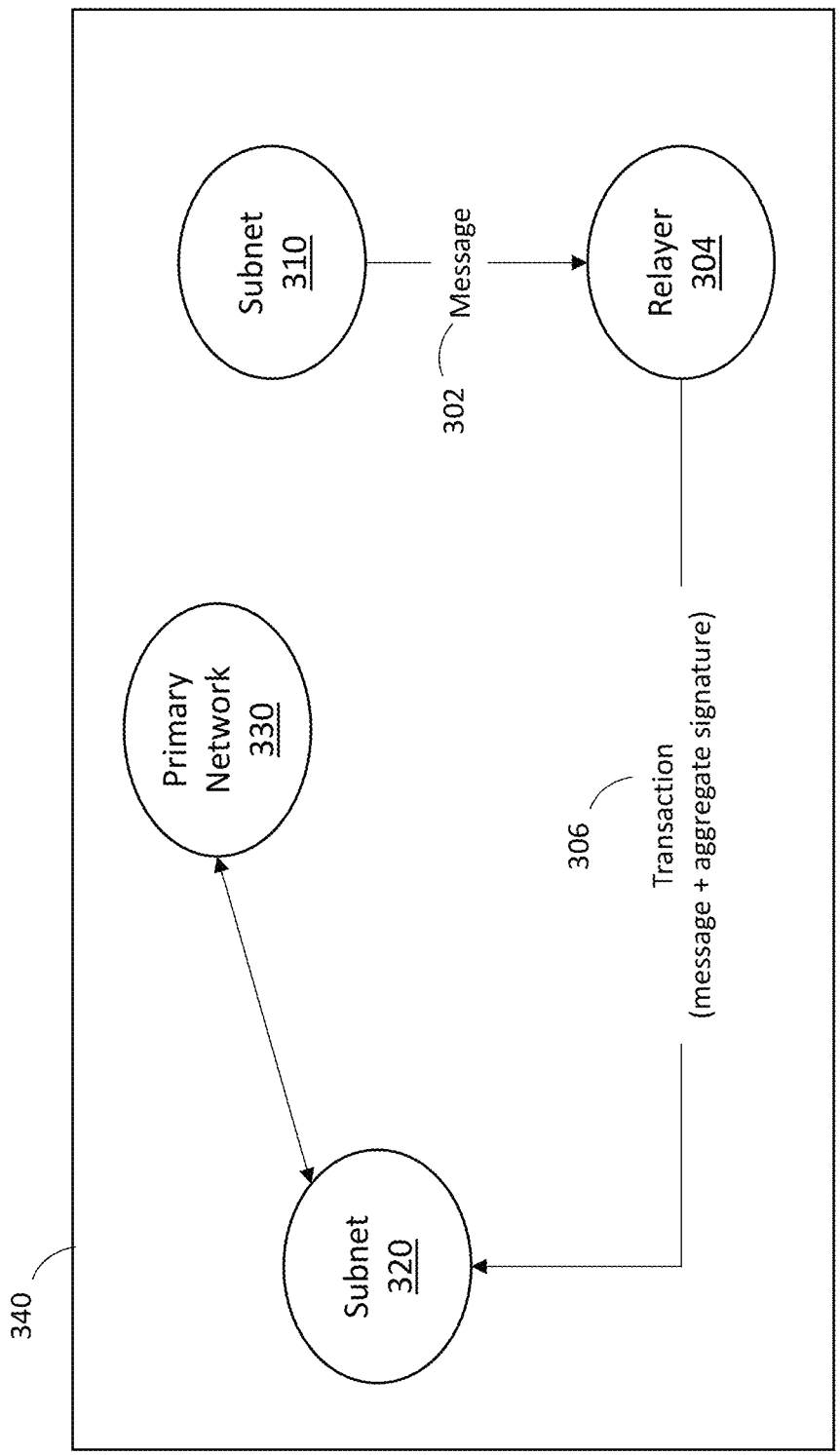
FIG. 3 is an example system flow diagram illustrating aspects of cross-subnet communication in a blockchain network, according to some embodiments, according to certain aspects of the present disclosure.

FIG. 3 is an example system flow diagram 300 illustrating aspects of cross-subnet communication in a blockchain network, according to some embodiments. The system flow diagram 300 describes a message transaction between a subnet 310 and a subnet 320 (e.g., a first and second subnet). The subnet 310 may represent a single blockchain validated by a set of validators or a collection of chains. The subnet 320 may represent a single blockchain validated by a set of validators or a collection of chains. The subnet 310 and subnet 320 may be validated by different sets of validators. According to embodiments, the cross-subnet communication described herein enables arbitrary data message passing such that any subnet in the blockchain network can send any type of message to any other subnet.

As described, a blockchain network 340 is a customized blockchain and may include one or more network layers such as, for example, a primary network 330. The primary network 330 may be responsible for coordinating and maintaining validators and subnets in the blockchain network 340. Each blockchain of the blockchain network 340 is validated by exactly one subnet, while a subnet can validate many blockchains.

Although FIG. 3 illustrates two subnets (i.e., subnet 310 and subnet 320), embodiments are not limited to this and may include a plurality of subnets validating a plurality of blockchains. A subnet refers to a set of validators (or nodes) which are registered in a shared registry on the primary network. A node may be a member of one or more subnets. Validators that wish to validate a chain that supports cross-chain communication enters a validator set. This allows the validator to become a participant working with other validators to achieve consensus on the state of the chain. The shared registry defines which nodes belong to which subnets (i.e., which nodes validate which one or more subnets). As such, all validators and subnet associations are known to all nodes in the blockchain network 340. In some embodiments, the shared registry may be on a specified chain of the primary network 340.

Each of the validators is assigned a corresponding signature key (e.g., BLS key). In some implementations, signature key registration is initiated by the respective validators. For example, when a validator is created, added to a validator set, and/or registered to the primary network, a signature key is generated, assigned to the validator, and the signature key is registered to the primary network. As such, non-validator nodes will not generate a signature. For purposes of this example, subnet 310 and subnet 320 do not share a set of validators, however, are of the same blockchain network 340. In some implementations, the subnet 310 and subnet 320 may share one or more validators or a set of validators. In some implementations, signature keys are stored on a shared key registry on a chain of the primary network 340. The shared key registry may be the same or different from the shared registry storing validator sets of the blockchain network 340.

A message 302 is created and sent at subnet 310. The message may be issued by a user. Creating a message may include generating a corresponding unique message ID. The message 302 may include a raw message and other metadata including, but not limited to, a destination chain ID, a destination subnet ID, source subnet ID, payload, payload length, validator bit vector, validator bit vector length, a destination address corresponding to the destination chain within the destination subnet, a fee contract address corresponding to a token used to pay the fee amount for sending the message, a fee amount, a required gas limit (i.e., a value sufficient for executing the message on the destination and to be provided when delivering the message on the destination), a set of relay addresses corresponding to relayers that are allowed to deliver the message, a message expiry timestamp, etc. A block representing the message 302 gets accepted and finalized as a block. Subsequently, one or more of the validators in the set of validators of subnet 310 sign the message 302 using their signature keys.

According to embodiments, message IDs may be calculated as a hash of the message data from the message. The message ID may be calculated as the hash of the message tuple (sourceBlockchainID, destinationBlockchainID, messageNonce). In some implementations, the message ID may be associated with a monotonic counter for the given destination subnet. This counter will be incremented by one each time a message is submitted and/or broadcasted for a given destination subnet ID.

The message 302 may comprise arbitrary bytes and in any formatting. In some implementations, contents of message 302 are converted to follow a standardized message format. The standardized message format and implementation thereof may be defined by the subnet and/or VM. In some implementations, the set of relay addresses comprise an empty array, indicating that any relayer (validator or non-validator) is able to deliver the message. In some embodiments, a hash of the message (and other metadata) is stored in a key-value database, mapping, for example, the destination subnet ID and the message ID to the message hash. The message hash may be kept within a VM state (e.g., state trie) and used later on to verify the correctness of the message contents during state sync of a node.

In some embodiments, a message database may be communicatively coupled to an accepted block database. The values stored in the message database may not be made available within a VM (i.e., message values cannot be read from within a transaction). A such, strict consistency of the message database across all validators is not required since it is not needed to process new transactions, nor does it affect the state of the blockchain. The message database may be bounded in size over time via an automatic pruning mechanism that cleans up messages that have already been received by the destination subnet. A VM state sync mechanism may also account for the message database by having a syncing node query peers for the messages to populate the message database after it finishes syncing the current state of the subnet/chain. As described, the source subnet contains message IDs that are supposed to be present and the message hashes. When syncing, a node can verify a peer gave it the correct message data by computing its hash and checking it against the message hash in the VM state. In some implementations, validator nodes generate a public signature of the message after storing the message in the message database.

According to embodiments, all validators in the set of validators of subnet 310 are willing to sign the message, but not all the validators may be required to sign the message to validate it. The signed block may be added to the blockchain, creating an unchangeable and transparent record of a first transaction including data of the message 302 created at subnet 310 and the message payload. The message payload may follow a standardized payload format across all subnets and/or VMs communication. In some embodiments, each subnet has the ability to customize and format a payload to meet their own criteria and requirements.

Once the message is accepted, message 302 (corresponding to the first transaction) is emitted. Events indicate that a successful message has been submitted and stored in the message database. The fee amount of the token (hereafter referred to as "message fee") may be transferred to the source address before the event is emitted. The source subnet (e.g., subnet 310) will track a fee asset type and transaction fee for each unique message ID (e.g., in the subnet VM state) and surface these values. Users can only use a single fee asset type to pay for a given message, as specified by the fee contract address of the initial call to send the cross-subnet message (i.e., message 302). Users can later add the initial fee amount but cannot change the asset type.

Relayer 304 takes the message 302 and queries validators of the subnet 310 for their signature keys to identify signatures of validators that signed (i.e., validated) the message 302. The identified signature keys corresponding to validators of message 302 are combined to construct an aggregate signature. Validator signatures generated using signature keys may be of length L. The signature keys are constructed such that two or more signatures generated using the signature key may be aggregated into a signature of the same length L. Aggregating the signatures compresses the data into a smaller format without losing any information to ensure that even in its aggregated form, the validators of signed message 302 may be identified via the aggregate signature. That is, the aggregate signature shows which validators have signed the message 302.

In some embodiments, when a relayer constructs an aggregate signature, it tracks which validator signatures it uses by creating a bit vector with canonical ordering of the source subnet validators where the index of validators whose signature was used is set to 1 and all other bits set to 0. The canonical ordering will be defined by ascending validator start time and then node ID (to ensure uniqueness). The bit vector may be ordered by start time to make the bit vector more robust to changes in the validator set. The bit vector may be padded with trailing zeros. By padding the bit vector indefinite trailing zeros, if a new validator is added after the aggregate signature and bit vector is created, it will not affect the correctness of the bit vector.

In some embodiments, a caching mechanism is implemented by the relayer to reduce the cost of constructing the aggregate public key. The caching mechanism is able to track the aggregate public keys for a given validator bit vector so long as there are no changes to the validator public keys or validator set on the primary network using cache. Each validator node can maintain the cache for subnets, and it can update/invalidate the cache entries whenever a change is identified in the validator set on the primary network. In some implementations, the change identified in the validator set on the primary network triggers an update to the corresponding aggregate key in the cache. In some implementations, small groups of commonly aggregated keys are cached and select sub-groups that are all represented in a validator bit vector.

In some implementations, one or more validators may be offline. In this instance, the signatures are re-aggregated and individual signatures of a given message ID are queried, allowing offline nodes to generate signature keys as needed. The signature keys may not be persisted, and as such are cached to optimize querying for a signature that has recently been generated.

The relayer 304 creates a transaction 306 that includes the aggregate signature and the message 302 and sends the transaction to subnet 320. In some implementations, the transaction 306 includes the bit vector identifying the validators that participated in the aggregate signature generation, and other metadata. The transaction 306 may include at least a portion of the message payload (e.g., comprising an arbitrary binary large object of bytes) that should be sent to subnet 320. In some implementations, the payload is a user-specified payload. By non-limiting example, the payload may indicate the message (e.g., raw message as byte input, message length, etc.), a sender, and a destination (e.g., chain or subnet) for the message (or transaction). The message payload may include a message nonce. The subnet 320 may verifying the message has not been executed based on the message nonce. The transaction 306 may specify the message fee amount to have the payload delivered to its destination (e.g., subnet 320). By non-limiting example, the message fee amount may correspond to a maximum value or a range for how much the user is willing to pay for the transaction to be delivered to its destination.

According to embodiments, the subnet 320 may transmit a proof to subnet 310 that a specific message from the subnet 310 has not and will never be received by the subnet 320. This proof may be provided based on the message expiry timestamp included in the message/message payload. A destination blockchain/subnet (e.g., subnet 320) may use the proof to verify that a given message has not been received yet based on the message nonce and verify that the message will never be received in the future by checking that the message expiry timestamp (i.e., the expiry time of the message) has passed. This allows a destination blockchain to tell the source blockchain that the destination blockchain did not receive a message by a certain deadline. In addition, given the deadline has passed, the destination blockchain will never accept the old message at a later time.

By non-limiting example, a source blockchain may send a message to the destination blockchain. The message may be delayed (or the like), resulting in a failure to arrive at the at the destination blockchain by a deadline identified by the expiry timestamp. The destination blockchain may then send a proof to source blockchain that the message did not arrive by the deadline. Therefore, even if the message finally arrives at the destination blockchain after the deadline, the destination blockchain will reject it. As such, the proof also proves that the message will never arrive at the destination blockchain. If the source blockchain wants to send the same message to the destination blockchain, the source blockchain would need to send a new message with a new deadline/expiry timestamp. The source blockchain may use the proof to revert the effects of sending the message. By non-limiting example, in a lock-and-mint bridge application, tokens that were previously locked when the message was sent could be unlocked if proof is provided that the message will never be delivered.

According to some embodiments, in order to create a valid aggregate signature, the relayer 304 must accumulate signatures sufficient enough to represent a stake threshold percentage of the source subnet (e.g., subnet 310). The transaction 306 is then created including the valid aggregate signature and transferred to the destination subnet (e.g., subnet 320) based on the stake threshold percentage being met. According to embodiments, only one relayer needs to successfully aggregate the signatures and only a percentage of the source subnet's stake needs to be represented in an aggregate signature in order for the aggregate signature to be considered valid. In some implementations, a threshold signature scheme may be implemented where a subnet uses an asynchronous distributed key generation phase, and then registers its threshold key on the shared key registry. Other cryptographic signature schemes understood by one of ordinary skill in the art may also be used. In some implementations, relayers may not have enough signatures to represent a sufficient percentage of the source subnet stake. In this case, an automatic retry mechanism may be activated where relayers are able to query peers for their signatures.

According to embodiments, the stake threshold may be set by the validators of the destination subnet as a security parameter for message verification. The threshold for a given destination subnet may be public knowledge, and relayers may be configured to include the fewest number of signatures in the aggregate to reach that threshold in order to minimize transaction fees (e.g., more signatures included in an aggregate signature may acquire higher transaction fees). Subnets (or VMs) require an arbitrary amount of gas in order to execute a message transfer and/or transaction.

In some embodiments, the relayer 304 delivering the message 302 is responsible for fronting the gas fee (or transaction fee) on the destination subnet (or chain) but will receive the fee amount paid in the transaction on the subnet 310 on an origin chain. In embodiments, the relayer implementation allows individual relayers to configure which fee assets they are willing to accept and may not relay messages whose fees are paid in other asset types. The implementation also allows for checking that the delivery of a given message is profitable by comparing the value of the fee amount to the value of the transaction fee they are fronting on the destination subnet (or chain).

The relayer 304 may not know exactly how much gas could be required before attempting to execute the message. This presents a possible denial-of-service (DOS) vector where the relayers may not provide enough gas for message execution and thus pays the transaction fee but not be entitled to collect the message reward paid as a fee on the source subnet (or chain). In order to prevent this, the sender (e.g., source subnet or chain) may specify the required gas limit within the message payload. For example, the message 302 on the subnet 310 may specify the amount of gas (i.e., transaction fees) the message 302 must be delivered with in order to ensure a successful delivery. The relayer 304 must provide at least this much gas to be available for relaying the message to subnet 320. As long as this requirement is met by the relayer, the message will be marked as "received," entitling the relayer to be paid the fee amount on the source subnet (or chain). In some implementations, when a relayer delivers the message and aggregate signature to the destination subnet, the relayer may specify the address that they would like the reward paid out to on the source subnet by the sender of the transaction.

The transaction 306 submitted on to subnet 320 from relayer 304 may be referred to as a second transaction (wherein the first transaction corresponds to the message 302 sent from the subnet 310 and received by relayer 304). The second transaction may include one or more of, for example, the message 302, the payload, and the aggregate signature. In some implementations, the relayer 304 is configured to generate the signature keys, broadcast them, aggregate them, and embed them in signed transactions (e.g., the second transaction).

In the example of FIG. 3, the relayer 304 is configured to query validators and aggregate signatures, however, embodiments are not limited to this. According to some embodiments, the message protocol may include a broadcast mechanism allowing any entity or node (off-chain) in the blockchain network 340 to act as a message replay and query the subnet 310 validators for their signature keys based on the block corresponding to the message 302 being accepted on the subnet 310, followed by the signature aggregation. By non-limiting example, via the broadcast mechanism, one subnet can publish information (about on-chain state, the network, and/or VM state) to any other chain that wants to consume that information. By non-limiting example, given a transaction is accepted on a subnet that a set of validators validate messages for, those set of validators can publicly provide their public signature keys to any entity in order to facilitate the transfer of the corresponding message. The entity may listen for new blocks in the blockchain network and scan the blocks for valid events corresponding to the first transaction being emitted from subnets.

In some embodiments, entities of the blockchain network 340 may be incentivized to relay messages in the form of transaction fees paid by the message sender (indicated in the message 302 metadata). By non-limiting example, the fee amount may be specified on a per message basis and paid by the message sender when originally submitting the message. By non-limiting example, the fee may be locked on the source subnet until it receives receipt information back from the destination subnet in order to pay the relayer. By non-limiting example, a gas fee proportional to the length of the message is charged to prevent it from being a DOS vector. By non-limiting example, a fee amount for the gas may be charged based on the number of validators identified in the bit vector in order to incentivize relayers to choose the smallest number of validators as possible that still represent the required stake threshold percentage. If the fee amount provided is not sufficient to incentivize any relayer, other entities have the ability to add to the fee amount for a given unprocessed message. In some embodiments, entities may not be required or incentivized to participate in relay messages. As such, the entities may use node resources instead. In order to ensure validators do not effectively opt out of generating individual signatures, other validators may monitor their participation and bench peers who do not participate properly. By non-limiting example, if a node generates an invalid signature for a given message, its peers will be able to identify the byzantine behavior and bench the node for a period of time. Validators may also be configured to identify if one of its peers is not generating signatures to sign messages when they are created and bench them in this case as well.

By non-limiting example, the user at a user interface (UI) may act as the relayer by sending a transaction on the source chain, waiting for that transaction to be accepted, querying the source chain's validators, generating an aggregate signature, and then broadcasting a transaction with the message and the aggregate signature on the destination chain. This instance of relaying the message requires sending multiple transactions; one on the source chain and one on the destination chain. By non-limiting example, a node may communicate a message to a destination chain/subnet via, for example, gossip. By non-limiting example, the message transfer request may be recorded in the primary network 330, which is centrally available to all subnets in the blockchain network 340.

In embodiments, entities (such as, relayer 304) may include an opt-in/out configuration. The opt-in/out configuration may contain the location of a key file to use for signing transactions on the destination subnet, as well as a URL of a destination subnet API to use to broadcast transactions. By non-limiting example, if a node opting in is running the destination subnet, the URL is able to be a local host endpoint; otherwise, it can also be a third-party API provider. When a node starts up that has opted in to being a relayer, it will print out a message making it clear that its account on the destination subnet must have sufficient balance of the native token to cover transaction fees of relaying the messages and signatures. As described, message sender (e.g., subnet 310) is able to denote a set of relayers that are allowed to deliver a given message (i.e., in a set of relay addresses). If the set of relays are not specified (e.g., the set of relay addresses array is empty), any relayer will be allowed to deliver the message. This feature enables custom relayer validity checks on specific message types. By non-limiting example, a closed set of relayers can perform a check validating that the result of delivering a bridge message will not under-collateralize the bridge and drop such a message and trigger an alarm should it ever occur. As such, an additional security layer can be incorporated that is very beneficial for high value applications that can be to build on top of the message protocol. Subnet 320 receives and accepts and verifies the transaction 306. Subnet 320 validates the transaction 306 and forwards the message to its destination address. The transaction 306 is validated by determining whether the stake threshold percentage of subnet 310 is included in the aggregate signature by referencing the primary network 330. For example, the destination subnet may confirm that at least a certain percentage of the source subnet's stake has signed the message. Validating the transaction 306 also ensures that the transaction has not been previously processed. Subnet 320 verifies the aggregate signature by looking up the validator set of subnet 310 at a specified block height in the primary network and comparing the aggregate signature against the public keys in the primary network; thus, verifying the transaction based on the aggregate signature.

Validating the transaction at the destination subnet also provides replay protection on the messages using unique message IDs of each received message. All nodes must perform this verification against the primary network height to ensure they all have deterministic execution of the transaction. If a message passes verification, the destination subnet will parse the message and its payload. The payload may be parsed according to the subnet's (or VM's) standardized payload format. The destination subnet will then check that it has not yet executed the given message ID from the given source subnet ID. If it has, it will return early with an error, otherwise it will mark the message ID as received, and pass the message on to the destination address. By first marking the message as received before passing the message to the, e.g., destination chain, reentrancy attacks where the destination address makes a recursive call back to a clearing house are prevented.

In some embodiments, if the subnet 320 (or destination chain) returns any error (e.g., an out-of-gas error), the message payload may be stored in a receiver precompile state of the destination subnet such that it can be retried by anyone (e.g., another relayer) in a separate transaction with a higher gas limit, activating the retry mechanism. Retrying the message execution allows for recovering messages that were delivered to the destination but failed due to a gas limit that was set to low by the sender. The entity retrying the execution will first look up the given message payload previously stored in the precompile state, and again try delivering the message with as much as is provided by the caller. If the call succeeds, the payload will be removed from the precompile state to ensure that it is only ever executed once. If the initial call to receive a cross subnet message (i.e., message 302) results in needing to store the message payload in the precompile state, the destination subnet (or VM) may charge a gas fee proportional to the payload length. The relayers must account for this possible fee amount when computing if a given message delivery will be profitable.

In some implementations, the shared registry is close to the tip of the primary network to reduce cost of looking up validators. By non-limiting example, a VM may verify messages against the canonical primary network block height provided by a proposer VM for the given block within the subnet. This block height value is guaranteed to be the same across all subnet validators within a given block in the subnet and will be the latest accepted block in the primary network across all validators (individual validators may accept the next block before others, but this value will have been accepted across the network). If an aggregate signature becomes stale due to new primary network blocks before it is accepted on the destination chain, relayer 304 can refresh the signature itself as long as it still has signatures representing the required weight of stake threshold.

By non-limiting example, the stake threshold may be a condition such that validators representing at least 80% of the members of subnet 310 have signed based on the aggregate signature received in the transaction 306. Since the shared registry indicates validators of any given subnet, the subnet 320 can leverage the primary network 330 to determine and prove (to any entity in the network) that a given message is signed by the specific percentage of subnet 310 validators. In this manner, validators of the destination subnet have unforgeable proof and can authenticate that a message has indeed been signed by a source subnet's set of validators. This confirms that the payload was actually sent by the source subnet without needing to know anything else about the state of the other network.

According to embodiments, the destination subnet (e.g., subnet 320) may track the relayer reward address that is owed the fee on the source subnet for each message ID that was successfully delivered. By non-limiting example, a (original) destination subnet may go next to send a message back to this same (original) source subnet, the original destination subnet will look up the message IDs that it has received from the original source subnet and the relayer reward address for each message. This information may be included in payload format and can act as receipts/acknowledgments from the original destination subnet that a given message has been successfully delivered. This requires maintaining a mapping of message ID and relayer reward address in a way that it can be iterated over. Tuples corresponding to this mapping may be maintained in an array storage.

To close the loop, when the original destination subnet receives a message with the receipt information, it will look up and payout the fee amounts it had previously stored to the relayer reward addresses specified in the message payload for the given message ID that it previously sent. As such, a relayer gets rewarded for delivering a message to a given destination subnet when that destination subnet next sends a message back to the original source subnet. The maximum batch size of the number of receipts that can be included in a single message may be limited. For example, if the message flow between two subnets is such that one receives more messages over the maximum batch size than it sends, relayers (or anyone in the blockchain network) can initiate sending empty messages back to the destination subnet so that the receipts are processed. Although embodiments describe cross-subnet communication, embodiments are not limited to subnet-to-subnet communication. Aspects of embodiments may be implemented to facilitate, for example, communication between a subnet and the primary network, cross-chain communication, or the like. According to some embodiments, for sending messages between a subnet and a chain, primary network validators may not need to create signatures/signature keys attesting to the occurrence of a given event because all subnet validators can also validate the state of a chain in the blockchain network. Instead, the subnet validators check their local nodes to verify the occurrence of the event.

According to some embodiments, for sending messages from a designated chain (e.g., contract chain (C-chain) of a blockchain network) to a subnet, a smart contract may be deployed on the chain. The smart contract may take arbitrary bytes as a message, assign the message a unique monotonically increasing ID for the given destination subnet, and store a hash of the message in the contract state. This smart contract may also transfer the given fee amount into its control and track the fee information for the message. The smart contract will also emit an event when a new message is successfully submitted. Nodes that opt in to be relayers for messages from the chain into subnets will poll for new message events emitted by the smart contract and submit these messages directly to the destination subnet within a transaction.

As signature keys are not needed, the transactions do not need an aggregate signature for the subnet to verify. Thus, when the destination subnet receives the message from the chain, the transaction may be validated by fetching the message hash stored in the chain state and verifying that the unsigned message provided results in the same hash. After validation of the message hash, the execution of messages received on the destination subnet from the chain will be the same as messages received from other subnets. As such, sending messages from a chain to a subnet includes providing replay protection, storing the relayer reward address, and storing the payload in a state of the subnet when an error is identified.

In some embodiments, the transaction may include transaction types indicating whether a message is from a subnet and whether a message is from a chain. The transaction type may be included in the message as metadata and prevents look back cost during bootstrapping. During bootstrapping, a node will not need to verify an aggregate signature because the node knows if the aggregate signature was included in an accepted block, the accepted block must have been valid at the time the block was verified/accepted by the blockchain network. For example, when a validator goes to build a block that contains the first transaction type, it must first verify that all of the messages it contains are valid by verifying their aggregate signatures. If any of the messages are not valid, the transaction will be dropped from the blockchain memory pool. It is considered an invalid block if any of the messages contained within the first transaction type are invalid. Similarly, the second transaction type will contain an array of message IDs to import from the sending chain, as well as a full unsigned message serialization for each transaction. In order to verify the transaction, nodes will look up the hash of the given message IDs from the current chain state and verify that the hash matches the hash of the provided unsigned message. If the hashes do not match, the transaction will be considered invalid and be dropped from the blockchain memory pool.

In some embodiments, the message protocol may include an update feature. By non-limiting example, when moving tokens from a second subnet to any other third subnet, the second or third subnet sends a cross subnet message back to the native chain indicating an accounting update (e.g., to move X number of locked tokens to the third subnet and send another message to the third subnet about the transfer). The tokens may stay locked on the native chain although the account balances are updated, and the native chain may automatically send the next message on to the third subnet to complete the transfer.

Figure 4:
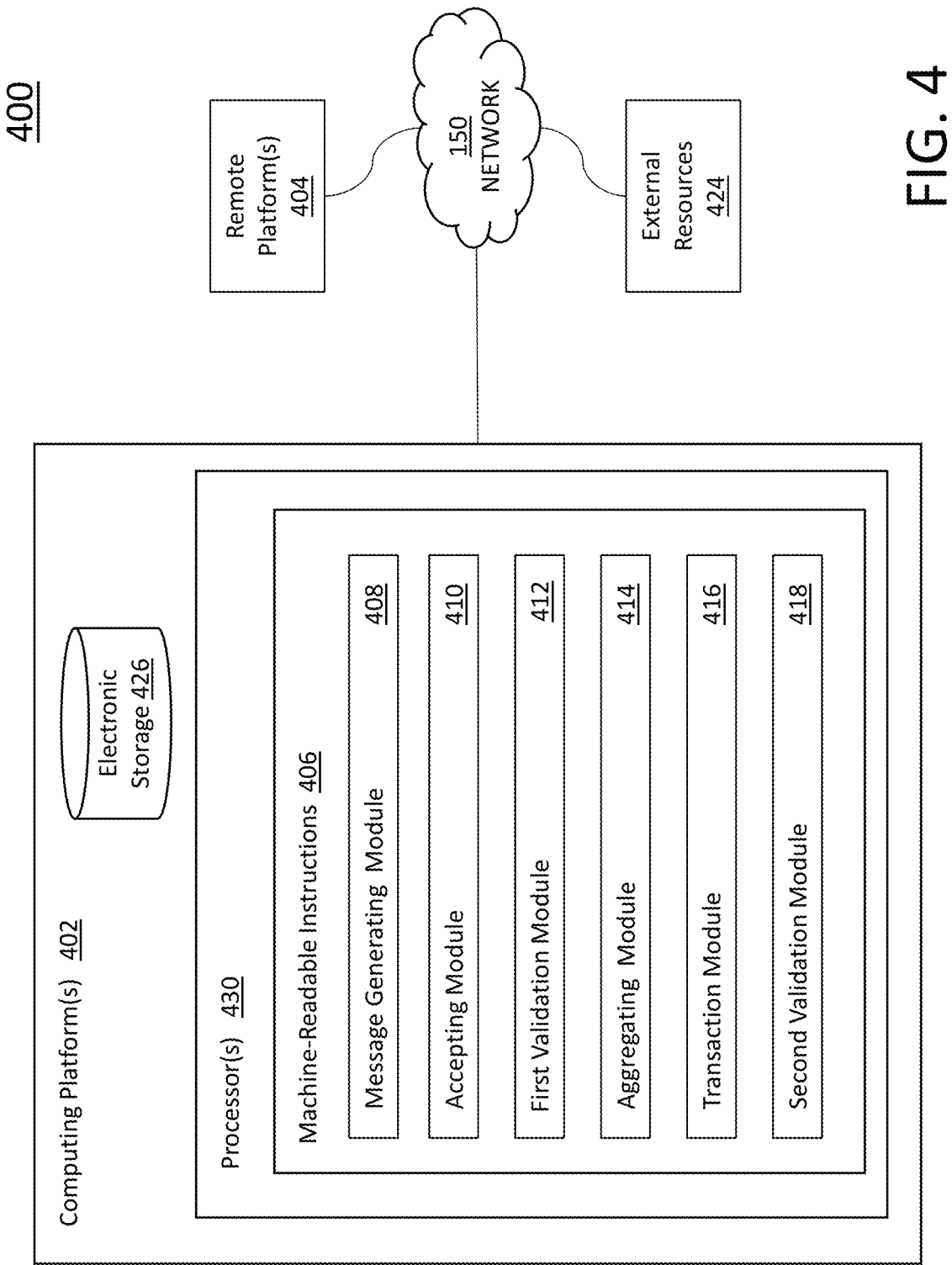
FIG. 4 is a block diagram illustrating a system configured for cross-chain communication, in accordance with one or more implementations.

FIG. 4 is a block diagram illustrating an example computer system 400 with which aspects of the subject technology can be implemented. The system 400 may be configured for cross-chain (or subnet) communication using messaging protocols, according to certain aspects of the disclosure. The system 400 can be or include a blockchain system/platform for managing blockchains, each of which may be a linear chain of blocks such that each block has a parent block. In some implementations, the system 400 may include one or more computing platforms 402. The computing platform(s) 402 can correspond to a server component of the blockchain platform, which can be similar to or the same as the computing device(s) of participant 130 of FIG. 1 and include the client computing device(s) of participant 110 of FIG. 1 and include the processors 205 in FIG. 2. For example, the computing platform(s) 402 may be configured to execute blockchain precompiles to generate, validate, and deliver a message from a source blockchain to a destination blockchain. Similarly, the blockchain precompiles may be applied to messages, for example, between a subnet and a chain and/or two subnets (e.g., subnet 310 and subnet 320 of FIG. 3).

Computing platform(s) 402 can be configured to implement messaging protocols enabling the transfer of messages from the client computing device(s). The computing platform(s) 402 may represent blockchain platforms (e.g., blockchain network 340). In some embodiments, the computing platform(s) 402 corresponds to a blockchain creating a message or a blockchain receiving a message. In some embodiments, the computing platform(s) 402 corresponds to a VM sending a message to a chain, VM, and/or subnet. The computing platform(s) 402 may be configured to communicate with one or more remote platforms 404 according to a client/server architecture, a peer-to-peer architecture, and/or other architectures. The remote platform(s) 404 may be configured to communicate with other remote platforms via computing platform(s) 402 and/or according to a client/server architecture, a peer-to-peer architecture, and/or other architectures. As an example, the remote platform(s) 404 can include relayers that determine which set of validator nodes are used to sign a message. The remote platform(s) 404 can be configured to cause output of the system 400 on client device(s) of the remote platform(s) 404 with enabled access (e.g., based on analysis by the computing platform(s) 402) according to stored data. Any external blockchain platform built based on a platform/metadata chain of the computing platform(s) 402 that relies on the primary blockchain may also realize the benefits of the messaging protocols. In this way, the platform chain, primary network, and other entities of the blockchain platform may communicate with the computing platform(s) 402. The computing platform(s) 402, external resources 424, and remote platform(s) 404 may be in communication and/or mutually accessible via the network 150.

The computing platform(s) 402 may be configured by machine-readable instructions 406. The machine-readable instructions 406 may be executed by the computing platform(s) to implement one or more instruction modules. The instruction modules may include computer program modules. The instruction modules being implemented may include one or more of message generating module 408, accepting module 410, first validation module 412, aggregating module 414, transaction module 416, second validation module 418 and/or other instruction modules.

The message generating module 408 is configured to generate a message at a first blockchain trying to send the message to a second blockchain. Both the first and second blockchains are included in a blockchain platform comprising a plurality of blockchains. In some implementations, the message is generated at a first subnet to be delivered to a second subnet (or chain). The second blockchain may include one or more destination blockchains or subnets. According to embodiments, a given message can only be delivered to its destination once. In some embodiments, the first blockchain specifies that a message may be delivered to one or more destination blockchains (e.g., to inform any destination chain that wants to receive the message about an updated value, or the like, on the source chain). Each blockchain (i.e., first blockchain and the one or more second blockchains) is validated by its own set of validators (or nodes) referred to as a subnet. The first blockchain's validators may be referred to as the first set of validators and the second blockchain's validators may be referred to as the second set of validators.

According to embodiments, the message may include a message ID which acts as a counter for the given destination chain, blockchain, and/or subnet. The message ID may be used to ensure that the same message, even when it is sent by a source chain (e.g., on the first blockchain) to a destination chain (e.g., on the second blockchain) multiple times, the message is only processed and delivered on the destination chain once. The source chain may submit the same message many times, for example, if the source chain encounters an error and thinks that message has failed to be processed on the destination chain. Although the message could be submitted to the destination chain multiple times, the message is only processed and delivered once. Any submissions subsequent to the delivery of the message is rejected and does not result in multiple deliveries. This prevents the source chain from erroneously sending and the destination chain from erroneously receiving multiple transactions.

The accepting module 410 is configured to accept, at the first blockchain, a first transaction including the message as a finalized block in the blockchain. The first transaction may include the message contents and a message payload. The message payload includes metadata describing the message. By non-limiting example, the payload may identify the second blockchain as a destination for the message. By non-limiting example, the message (or message payload) on the source chain may specify the amount of gas (i.e., transaction fees) required to ensure a successful delivery of the message to the destination.

The first validation module 412 is configured to perform a validation process for the message at the first blockchain. The validation process may include signing the message using signature keys in a first set of validators of the first blockchain. The validators of the first blockchain see the first transaction get accepted and one or more of the validators sign the message using their signature keys. The first set of validators are stored in a shared registry between blockchains in the blockchain platform. The shared registry defines which validators belong to which blockchains. The shared registry may be maintained in a distributed ledger known to both the first blockchain and the second blockchain (e.g., primary network or primary chain of the blockchain platform). The signature keys are configured prior to the transaction. The shared registry may include a key registry for storing and tracking validator signature keys. The signature keys may be obtained from the key registry for the validation process. In some implementations, the signature keys are stored in a separate database or shared key registry. The validated message is then broadcasted to peers in the blockchain platform.

The aggregating module 414 is configured to perform an aggregating process to generate an aggregate signature based on the signature keys of the one or more validators that signed the message. In some embodiments, entities of the blockchain platform (e.g., a relayer, node, UI, etc.) that have opted into signature aggregation listen for the broadcasted (validated) message, take the message, and identify what nodes have participated in the message validation. Based on the identified nodes, the aggregate signature representing all the signature keys of validators in the first set of validators that have signed the message is generated. The aggregate signature may be the same length as any individual signature generated using any of the signature keys. In some embodiments, the entities of the blockchain platform are incentivized to relay messages using a fee (e.g., message fee) paid in the first transaction on the first blockchain.

In some embodiments, the one or more validators in the first set of validators signing the message must meet at least a threshold stake percentage of the first set of validators. That is, not all the validators of the first set of validators must sign the message for it to be sent to its destination. Once a sufficient number of signatures are accumulated to meet the threshold stake percentage, the aggregate signature may be generated. In some implementations, the threshold stake percentage is set by the validators of the second blockchain as a security parameter for message verification. The threshold for destination blockchains may be public knowledge. In some implementations, message relaying entities have to pay a higher transaction fee the more signatures being included in the aggregate signature. Thus, they want to include the fewest number of signatures in the aggregate signature to reach that threshold and minimize cost.

According to some embodiments, when blocks are accepted at source blockchains, an event containing the messages to be relayed to the corresponding destination(s) may be triggered. The off-chain entities in the blockchain platform scan for events being emitted and select a message to replay based at least on the message payload. By non-limiting example, after the first blockchain accepts the message, an entity selects the first transaction and generates the aggregate signature.

According to embodiments, the aggregating process may include querying the first set of validators, and identifying, based on the querying, the one or more validators in the first set of validators that signed the message from the first transaction. The aggregating module 414 may be further configured to generate a bit vector with canonical ordering of the first set of validators, wherein elements corresponding to indices of validators that signed the message is set to one (1) and elements corresponding to indices of validators that did not sign the message is set to zero (0).

The transaction module 416 is configured to generate a second transaction including at least the message and the aggregate signature. The second transaction is a signed transaction created based on the aggregate signature and submitted on to the second blockchain. The aggregate signature may be embedded in the second transaction. In some embodiments, the second transaction includes the bit vector identifying which validators participated in signing the first transaction and/or other metadata. By non-limiting example, the entity that selects the first transaction and generates the aggregate signature is further configured to submit the second transaction to the second blockchain. According to embodiments, the system 400 is further configured to accept, at the second blockchain, the second transaction and proceed with verifying the second transaction.

The second validation module 418 is configured to perform a validation process for the second transaction at the second blockchain by leveraging the shared registry. The validation process at the second blockchain may include identifying the one or more validators in the first set of validators that signed the message based on the aggregate signature. It can then be determined whether the stake threshold percentage of the first set of validators is included in the aggregate signature by referencing the shared registry.

According to embodiments, the system 400 is further configured to deliver the message included in the validated second transaction to its corresponding destination. The message cannot be delivered to the destination no more than one time. The destination may include, for example, the second blockchain, a chain on the second blockchain, or an application on the second blockchain. In some embodiments, the message payload may specify a destination address. According to embodiments, the system 400 is further configured to, based on a successful validation process, deliver the second transaction to the destination address.

In some implementations, the computing platform(s) 402, the remote platform(s) 404, and/or the external resources 424 may be operatively linked via one or more electronic communication links. For example, such electronic communication links may be established, at least in part, via the network 150 such as the Internet and/or other networks. It will be appreciated that this is not intended to be limiting, and that the scope of this disclosure includes implementations in which the computing platform(s) 402, the remote platform(s) 404, and/or the external resources 424 may be operatively linked via some other communication media.

A given remote platform 404 may include client computing devices, which may each include one or more processors configured to execute computer program modules. The computer program modules may be configured to enable an expert or user associated with the given remote platform 404 to interface with the system 400 and/or external resources 424, and/or provide other functionality attributed herein to remote platform(s) 404. By way of non-limiting example, a given remote platform 404 and/or a given computing platform 402 may include one or more of a server, a desktop computer, a laptop computer, a handheld computer, a tablet computing platform, a NetBook, a Smartphone, a gaming console, and/or other computing platforms. The external resources 424 may include sources of information outside of the system 400, external entities participating with the system 400, and/or other resources. For example, the external resources 424 may include externally designed blockchain elements and/or applications designed by third parties. In some implementations, some or all of the functionality attributed herein to the external resources 424 may be provided by resources included in system 400.

Computing platform(s) 402 may include the electronic storage 426, a processor such as the processors 205, and/or other components. The computing platform(s) 402 may include communication lines, or ports to enable the exchange of information with a network and/or other computing platforms. Illustration of the computing platform(s) 402 in FIG. 4 is not intended to be limiting. The computing platform(s) 402 may include a plurality of hardware, software, and/or firmware components operating together to provide the functionality attributed herein to the computing platform(s) 402. For example, the computing platform(s)

402 may be implemented by a cloud of computing platforms operating together as the computing platform(s) 402.

Electronic storage 426 may include non-transitory storage media that electronically stores information. The electronic storage media of the electronic storage 426 may include one or both of system storage that is provided integrally (i.e., substantially non-removable) with computing platform(s) 402 and/or removable storage that is removably connectable to computing platform(s) 402 via, for example, a port (e.g., a USB port, a firewire port, etc.) or a drive (e.g., a disk drive, etc.). Electronic storage 426 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 426 may include one or more virtual storage resources (e.g., cloud storage, a virtual private network, and/or other virtual storage resources). Electronic storage 426 may store software algorithms, information determined by the processors 205, information received from computing platform(s) 402, information received from the remote platform(s) 404, and/or other information that enables the computing platform(s) 402 to function as described herein.

Processor(s) 430 may be configured to provide information processing capabilities in computing platform(s) 402. As such, processor(s) 430 may include one or more of a digital processor, an analog processor, a digital circuit designed to process information, an analog circuit designed to process information, a state machine, and/or other mechanisms for electronically processing information. Although processor(s) 430 is shown in FIG. 4 as a single entity, this is for illustrative purposes only. In some implementations, processor(s) 430 may include a plurality of processing units. These processing units may be physically located within the same device, or processor(s) 430 may represent processing functionality of a plurality of devices operating in coordination. Processor(s) 430 may be configured to execute modules 408, 410, 412, 414, 416, and/or 418, and/or other modules. Processor(s) 430 may be configured to execute modules 408, 410, 412, 414, 416, and/or 418, and/or other modules by software; hardware; firmware; some combination of software, hardware, and/or firmware; and/or other mechanisms for configuring processing capabilities on processor(s) 430. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 408, 410, 412, 414, 416, and/or 418 are illustrated in FIG. 4 as being implemented within a single processing unit, in implementations in which processor(s) 430 includes multiple processing units, one or more of modules 408, 410, 412, 414, 416, and/or 418 may be implemented remotely from the other modules. The description of the functionality provided by the different modules 408, 410, 412, 414, 416, and/or 418 described below is for illustrative purposes, and is not intended to be limiting, as any of modules 408, 410, 412, 414, 416, and/or 418 may provide more or less functionality than is described. For example, one or more of modules 408, 410, 412, 414, 416, and/or 418 may be eliminated, and some or all of its functionality may be provided by other ones of modules 408, 410, 412, 414, 416, and/or 418. As another example, processor(s) 430 may be configured to execute one or more additional modules that may perform some or all of the functionality attributed below to one of modules 408, 410, 412, 414, 416, and/or 418.

The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s).

Figure 5:
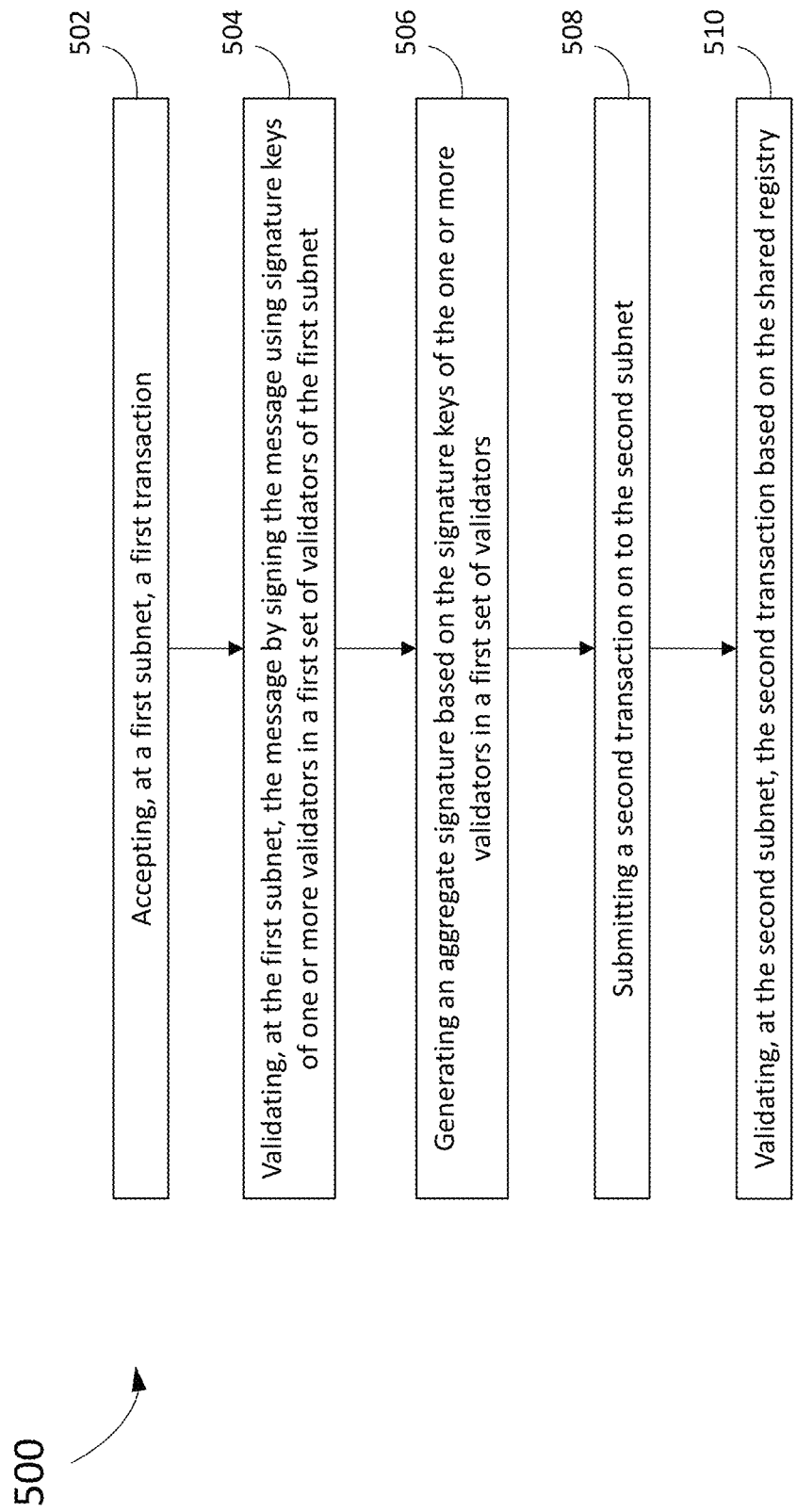
FIG. 5 is an example flow diagram for cross-subnet communication, according to certain aspects of the present disclosure.

FIG. 5 illustrates an example flow diagram (e.g., process 500) for cross-chain communication, according to certain aspects of the disclosure. For explanatory purposes, the steps of the example process 500 are described herein as occurring in serial, or linearly. However, multiple instances of the example process 500 may occur in parallel, overlapping in time, almost simultaneously, or in a different order from the order illustrated in the process 500. In addition, the blocks of the example process 500 need not be performed in the order shown and/or one or more of the blocks of the example process 500 need not be performed.

At step 502, the process 500 may include accepting, at a first blockchain, a first transaction including a message and a message payload. According to an aspect of embodiments, the message payload may include metadata indicating, for example, the first blockchain, the destination blockchain, transactions fees, or the like. At step 504, the process 500 may include validating, at the first blockchain, the message by signing the message using signature keys of one or more validators in a first set of validators of the first blockchain. According to an aspect of embodiments, once a stake threshold number of validators of the first set of validators is met, the first transaction is emitted by the first blockchain and broadcasted to the blockchain network.

At step 506, an aggregate signature is generated based on the signature keys of the one or more validators in a first set of validators. The signature keys of the first set of validators are stored in a shared registry. The shared registry may be maintained in a distributed ledger known to both the first blockchain and the second blockchain (e.g., primary network or primary chain of the blockchain platform). The aggregate signature may be the same length as any individual signature generated using any of the signature keys. In some implementations, the relayer queries the first set of validators to identify which validators have signed the message included in the first transaction. At step 508, a second transaction is submitted on to the second blockchain. The second transaction may include the message, the message payload, and the aggregate signature. According to embodiments, generating the aggregate signature may include generating a bit vector with canonical ordering of the first set of validators. In the bit vectors, the elements corresponding to indices of validators that signed the message are set to one and elements corresponding to indices of validators that did not sign the message are set to zero.

At step 510, the second transaction is validated, at the second blockchain, based on the shared registry. According to embodiments, the one or more validators in the first set of validators are identified by referencing the aggregate signature. Upon identifying the signing validators, whether the stake threshold percentage of the first set of validators are included in the aggregate signature is validating.

The techniques described herein (for example, process 500) may be implemented as method(s) that are performed by physical computing device(s); as one or more non-transitory computer-readable storage media storing instructions which, when executed by computing device(s), cause performance of the method(s); or as physical computing device(s) that are specially configured with a combination of hardware and software that causes performance of the method(s).

In some implementations, one or more operation blocks of FIG. 5 may be performed by a processor circuit executing instructions stored in a memory circuit, in a client device, a remote server or a database, communicatively coupled through a network (e.g., processors 205, memories 220, participant 110, participant 130, database(s) 152, and network 150).

Although FIG. 5 shows example blocks of the process 500, in some implementations, the process 500 may include additional blocks, fewer blocks, different blocks, or differently arranged blocks than those depicted in FIG. 5.

Hardware Overview

Figure 6:
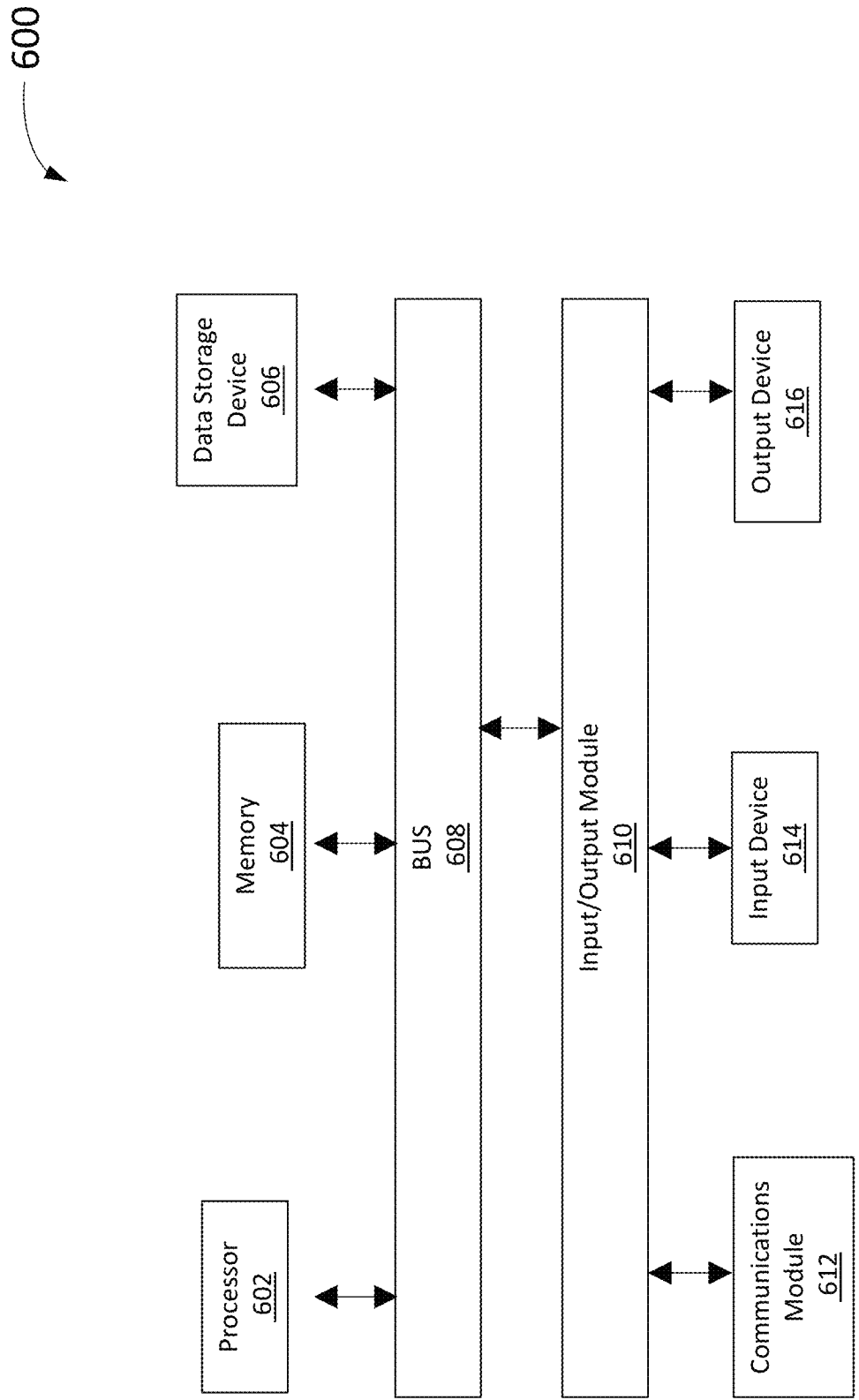
FIG. 6 is a block diagram illustrating an example computer system with which aspects of the subject technology can be implemented.

FIG. 6 is a block diagram illustrating an exemplary computer system 600 with which aspects of the subject technology can be implemented. In certain aspects, the computer system 600 may be implemented using hardware or a combination of software and hardware, either in a dedicated server, integrated into another entity, or distributed across multiple entities.

The computer system 600 (e.g., server and/or participant) includes a bus 608 or other communication mechanism for communicating information, and a processor 602 coupled with the bus 608 for processing information. By way of example, the computer system 600 may be implemented with one or more processors 602. Each of the one or more processors 602 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

The computer system 600 can include, in addition to hardware, code that creates an execution environment for the computer program in question, e.g., code that constitutes processor firmware, a protocol stack, a database management system, an operating system, or a combination of one or more of them stored in an included memory 604, such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled to bus 608 for storing information and instructions to be executed by processor 602. Processor 602 and memory 604 can be supplemented by, or incorporated in, special purpose logic circuitry.

The instructions may be stored in memory 604 and implemented in one or more computer program products, i.e., one or more modules of computer program instructions encoded on a computer-readable medium for execution by, or to control the operation of, the computer system 600, and according to any method well-known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 604 may also be used for storing temporary variable or other intermediate information during execution of instructions to be executed by the processor 602.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

The computer system 600 further includes a data storage device 606 such as a magnetic disk or optical disk, coupled to bus 608 for storing information and instructions. The computer system 600 may be coupled via input/output module 610 to various devices. The input/output module 610 can be any input/output module. Exemplary input/output modules 610 include data ports such as USB ports. The input/output module 610 is configured to connect to a communications module 612. Exemplary communications modules 612 include networking interface cards, such as Ethernet cards and modems. In certain aspects, the input/output module 610 is configured to connect to a plurality of devices, such as an input device 614 and/or an output device 616. Exemplary input devices 614 include a keyboard and a pointing device, e.g., a mouse or a trackball, by which a user can provide input to the computer system 600. Other kinds of input devices can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Exemplary output devices 616 include display devices such as an LCD (liquid crystal display) monitor, for displaying information to the user.

According to one aspect of the present disclosure, the above-described systems can be implemented using a computer system 600 in response to the processor 602 executing one or more sequences of one or more instructions contained in the memory 604. Such instructions may be read into memory 604 from another machine-readable medium, such as data storage device 606. Execution of the sequences of instructions contained in the main memory 604 causes the processor 602 to perform the process steps described herein. One or more processors in a multi-processing arrangement may also be employed to execute the sequences of instructions contained in the memory 604. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., such as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

The computer system 600 can include clients and servers. A client and server are generally remote from each other and typically interact through a communication network. The relationship of client and server arises by virtue of computer programs running on the respective computers and having a client-server relationship to each other. The computer system 600 can be, for example, and without limitation, a desktop computer, laptop computer, or tablet computer. The computer system 600 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to the processor 602 for execution. Such a medium may take many forms, including, but not limited to, non-volatile media, volatile media, and transmission media. Non-volatile media include, for example, optical or magnetic disks, such as the data storage device 606. Volatile media include dynamic memory, such as the memory 604. Transmission media include coaxial cables, copper wire, and fiber optics, including the wires that comprise the bus 608. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s).

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the terms "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

It should be understood that the original applicant herein determines which technologies to use and/or productize based on their usefulness and relevance in a constantly evolving field, and what is best for it and its players and users. Accordingly, it may be the case that the systems and methods described herein have not yet been and/or will not later be used and/or productized by the original applicant. It should also be understood that implementation and use, if any, by the original applicant, of the systems and methods described herein are performed in accordance with its privacy policies. These policies are intended to respect and prioritize player privacy, and to meet or exceed government and legal requirements of respective jurisdictions. To the extent that such an implementation or use of these systems and methods enables or requires processing of user personal information, such processing is performed (i) as outlined in the privacy policies; (ii) pursuant to a valid legal mechanism, including but not limited to providing adequate notice or where required, obtaining the consent of the respective user; and (iii) in accordance with the player or user's privacy settings or preferences. It should also be understood that the original applicant intends that the systems and methods described herein, if implemented or used by other entities, be in compliance with privacy policies and practices that are consistent with its objective to respect players and user privacy.

What is claimed is:

1. A computer-implemented method for cross-chain communication, the method comprising:
   receiving a transaction including a message and an aggregate signature, the aggregate signature generated based on signature keys corresponding to one or more validators of a source blockchain that signed the message;
   identifying the one or more validators of the source blockchain based on the aggregate signature;
   determining, based on a shared registry, whether the one or more validators comprise a stake threshold percentage of validators of the source blockchain;
   validating the transaction based on the one or more validators comprising the stake threshold percentage of validators; and
   transmitting a receipt message to the source blockchain indicating a successful delivery of the message.

2. The computer-implemented method of claim 1, further comprising:
   verifying the message has not been executed based on a message nonce associated with the message and included in a message payload for the transaction.

3. The computer-implemented method of claim 1, further comprising transmitting a proof to the source blockchain based on at least an expiry timestamp included in the message and a message nonce, the proof indicating that the message has not been received and will never be received at the destination blockchain.

4. The computer-implemented method of claim 1, further comprising generating the message at the source blockchain, wherein the transaction further includes a message payload at least identifying a destination address for the message.

5. The computer-implemented method of claim 1, wherein the signature keys of the one or more validators are stored on a distributed ledger known to both the source blockchain and a destination blockchain.

6. The computer-implemented method of claim 1, further comprising:
   querying validators of the source blockchain; and
   identifying, based on the querying, the one or more validators that signed the message from the transaction from the validators.

7. The computer-implemented method of claim 1, wherein generating an aggregate signature further comprises:
   generating a bit vector with canonical ordering of the one or more validators, wherein elements corresponding to indices of validators that signed the message is set to one (1) and elements corresponding to indices of validators that did not sign the message is set to zero (0).

8. The computer-implemented method of claim 1, further comprising:
   emitting an event based on the source blockchain accepting the transaction;
   scanning, by an entity, a blockchain platform for events emitted in the blockchain platform, the event containing messages to be relayed to corresponding destinations; and
   selecting, by the entity, the transaction based at least on a message payload.

9. The computer-implemented method of claim 1, further comprising delivering the message to a destination, wherein the message is delivered to the destination no more than one time, the destination including a blockchain or an application on the blockchain.

10. The computer-implemented method of claim 1, wherein the message specifies a fee required to successfully deliver the message to a corresponding destination.

11. A system for cross-chain communication in a blockchain platform, comprising:
    one or more processors; and
    a memory comprising instructions stored thereon, which when executed by the one or more processors, causes the one or more processors to perform:
       receiving a transaction including a message and an aggregate signature, the aggregate signature generated based on signature keys corresponding to one or more validators of a source blockchain that signed the message;
       identifying the one or more validators of the source blockchain based on the aggregate signature;
       determining, based on a shared registry, whether the one or more validators comprise a stake threshold percentage of validators of the source blockchain;
       validating the transaction based on the one or more validators comprising the stake threshold percentage of validators; and
       transmitting a receipt message to the source blockchain indicating a successful delivery of the message.

12. The system of claim 11, wherein the instructions, when executed by the one or more processors, cause the one or more processors to perform verifying the message has not been executed based on a message nonce associated with the message and included in a message payload for the transaction.

13. The system of claim 11, wherein the instructions, when executed by the one or more processors, cause the one or more processors to transmit a proof to the source blockchain based on at least an expiry timestamp included in the message and a message nonce, the proof indicating that the message has not been received and will never be received at the destination blockchain.

14. The system of claim 11, wherein the instructions, when executed by the one or more processors, cause the one or more processors to perform generating the message at the source blockchain, wherein the transaction further includes a message payload at least identifying a destination address for the message.

15. The system of claim 11, wherein the signature keys of the one or more validators are stored on a distributed ledger known to both the source blockchain and a destination blockchain.

16. The system of claim 11, wherein the instructions, when executed by the one or more processors, cause the one or more processors to perform:
   querying validators of the source blockchain; and
   identifying, based on the querying, the one or more validators that signed the message from the transaction from the validators.

17. The system of claim 11, wherein the instructions, when executed by the one or more processors, cause the one or more processors to perform:
   generating a bit vector with canonical ordering of the one or more validators, wherein elements corresponding to indices of validators that signed the message is set to one (1) and elements corresponding to indices of validators that did not sign the message is set to zero (0).

18. The system of claim 11, further comprising stored sequences of instructions, which when executed by the one or more processors, cause the one or more processors to perform:
   emitting an event based on the source blockchain accepting the transaction;
   scanning, by an entity, a blockchain platform for events emitted in the blockchain platform, the event containing messages to be relayed to corresponding destinations; and
   selecting, by the entity, the transaction based at least on a message payload.

19. The system of claim 11, further comprising stored sequences of instructions, which when executed by the one or more processors, cause the one or more processors to perform delivering the message to a destination, wherein the message is delivered to the destination no more than one time, the destination including a blockchain or an application on the blockchain.

20. The system of claim 11, wherein the message specifies a fee required to successfully deliver the message to a corresponding destination.

21. A non-transitory computer-readable storage medium comprising instructions stored thereon, which when executed by one or more processors, cause the one or more processors to perform operations for cross-chain communication in a blockchain platform, comprising:
   receiving a transaction including a message and an aggregate signature, the aggregate signature generated based on signature keys corresponding to one or more validators of a source blockchain that signed the message;
   identifying the one or more validators of the source blockchain based on the aggregate signature;
   determining, based on a shared registry, whether the one or more validators comprise a stake threshold percentage of validators of the source blockchain;
   validating the transaction based on the one or more validators comprising the stake threshold percentage of validators; and
   transmitting a receipt message to the source blockchain indicating a successful delivery of the message.

* * * * *